(Model.)

W. T. WILDE.
Harvesting Machine.

No. 239,075. Patented March 22, 1881.

Witnesses:

Inventor:
William Thomas Wilde

UNITED STATES PATENT OFFICE.

WILLIAM T. WILDE, OF COLORADO, KANSAS.

HARVESTING-MACHINE.

SPECIFICATION forming part of Letters Patent No. 239,075, dated March 22, 1881.

Application filed October 2, 1880. (Model.)

*To all whom it may concern:*

Be it known that I, WILLIAM T. WILDE, of Colorado, in the county of Lincoln and State of Kansas, have invented certain new and useful Improvements in Harvesting-Machines; and I do hereby declare the following to be a full, clear, and exact description of the same, reference being made to the accompanying drawings, forming a part of this specification, and in which—

Figure 1:
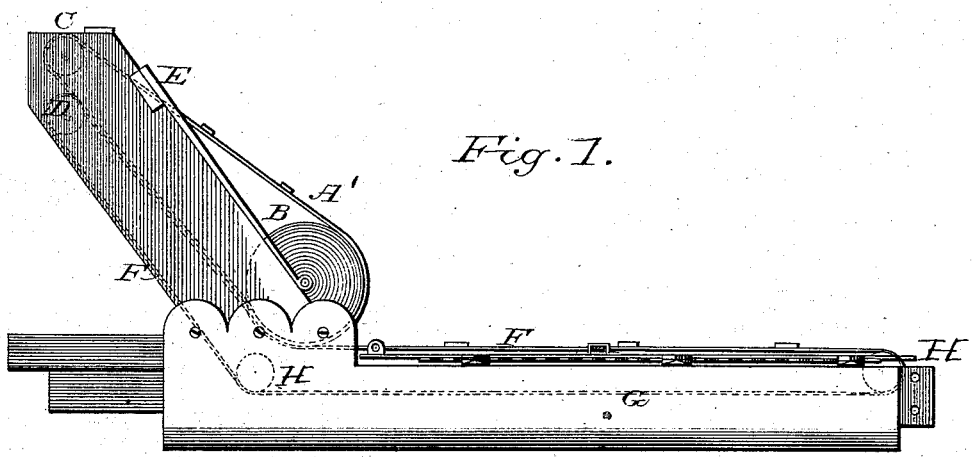
Figure 2:
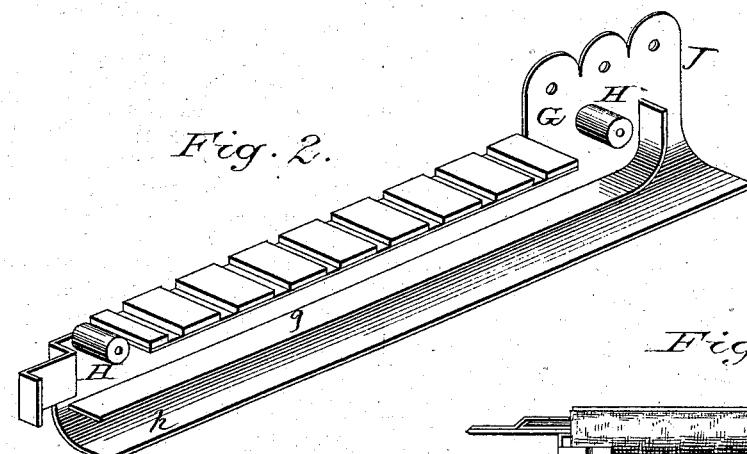
Figure 3:
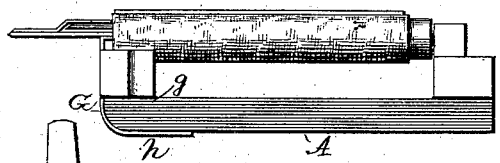
Figure 4:
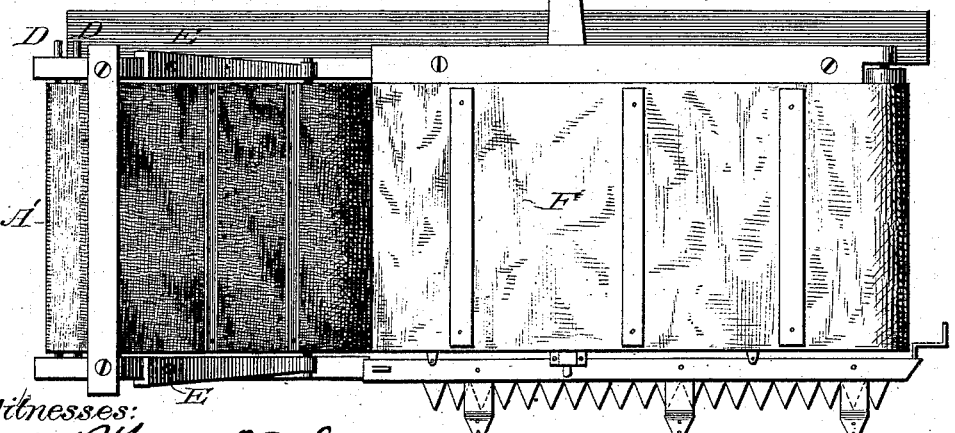

Figure 1 is a front view, partly in section, of my improvement. Fig. 2 is a detailed perspective view of the concave finger-bar; Fig. 3 an end view, and Fig. 4 a plan view.

This invention relates to certain new and useful improvements in the class of harvesting-machines having an endless platform and elevator-apron for conveying the grain to the binding-table or header-box; and the invention consists in the novel construction, combination, and arrangement of parts, all as will be hereinafter fully described, and specifically pointed out in the claim.

To enable others skilled in the art to make and use my invention, I will now proceed to describe its construction and operation.

In the drawings, A represents the usual platform-flooring, and G the finger-bar, made concave in cross-section, as clearly shown in Figs. 2 and 3. This finger-bar is provided with an interior projecting longitudinal flange, $g$, curved upward at the inner end thereof in rear of the pulley H, and said bar is secured to the front end of the platform, which passes between the flange $g$ and the lower portion, $h$, of said bar, by screws or other equivalent means. The inner end of said bar G is provided with a vertical portion, J, secured to one of the inclined supports of the elevator-frame.

H H represent transverse rollers, around which the endless platform-apron F passes, said rollers being journaled in the front portion of finger-bar and supports at the rear and top side of platform A.

By the above-described arrangement of parts it will be observed that the apron F is brought close up to the sickle-bar, thereby preventing waste of grain between the platform-apron and the elevator. The endless apron F also passes around roller D, journaled near the top of elevator-frame, and which may be geared with the roller C, around which passes the upper endless apron, A', which also passes over large drum or roller B at the bottom of elevator-frame. This drum or roller B is journaled in spring-bearings E E, and bears against the upper side of the endless apron F, which holds it securely in place on the finger-bar. The grain passes up between the aprons F and A', and is discharged onto the binding-table or in the header-box in the usual manner.

Having thus fully described my invention, what I claim as new, and desire to secure by Letters Patent, is—

In a harvester, the combination, with the platform-flooring A, of the sickle-bar G, made concave in cross-section, and provided with an interior projecting longitudinal flange, $g$, and the vertical projecting portion J, and the transverse rollers H H, for the endless platform-apron F, journaled to said bar, and supports on the platform, substantially as and for the purpose herein shown and described.

WILLIAM T. WILDE.

Witnesses:
J. A. BROSSEAU,
J. W. BRAM.